Dec. 20, 1938. H. C. AVERY 2,140,932
POT OR CONTAINER
Filed Feb. 27, 1936
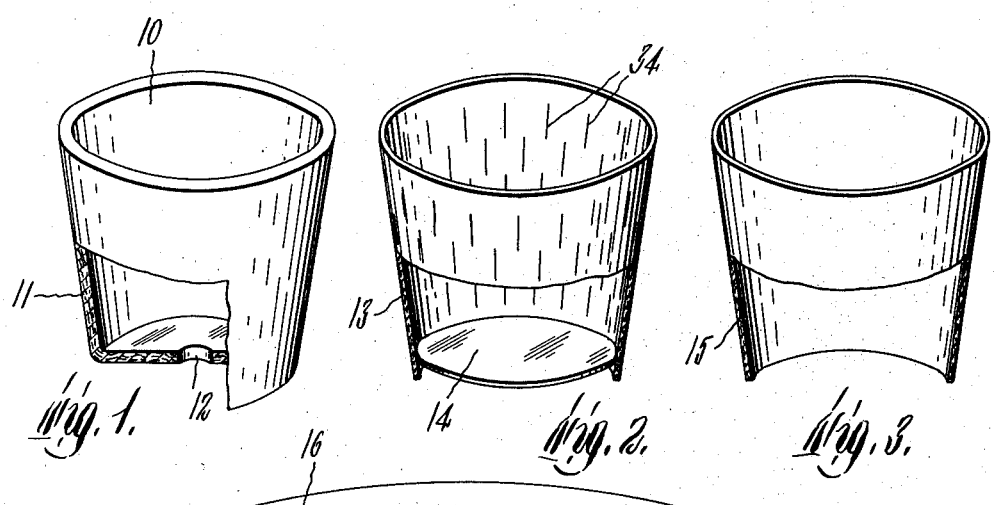
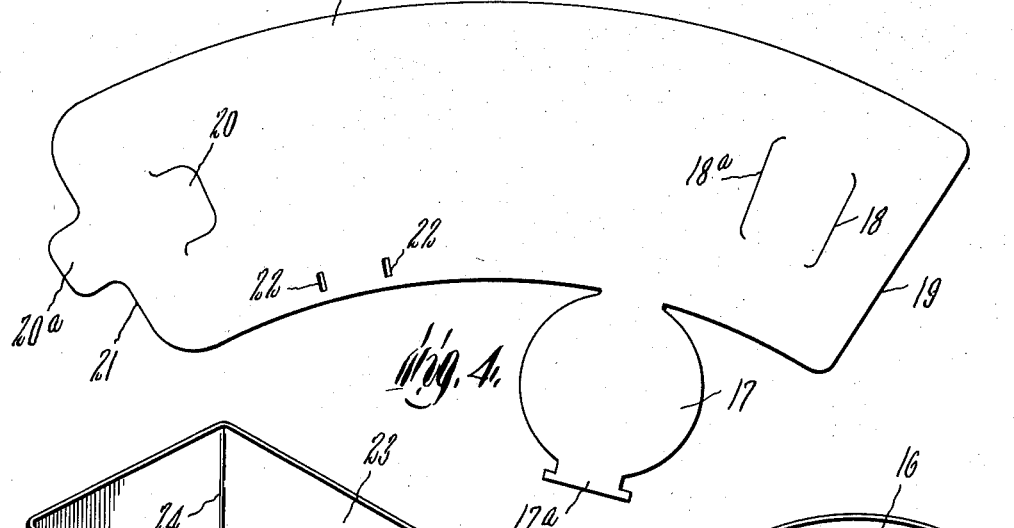
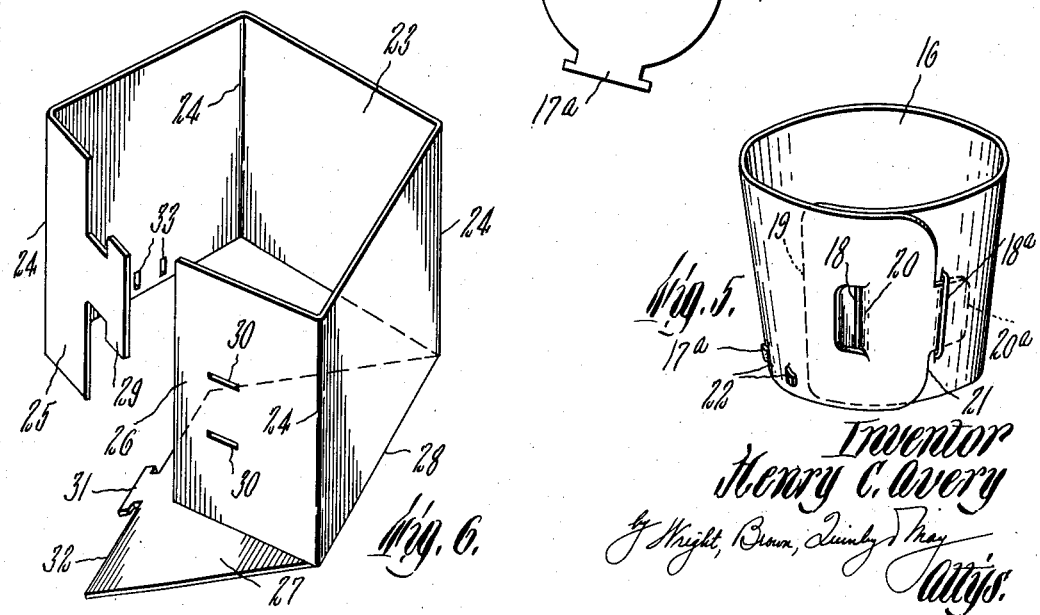
Inventor
Henry C. Avery Patented Dec. 20, 1938

2,140,932

UNITED STATES PATENT OFFICE 2,140,932

POT OR CONTAINER

Henry C. Avery, West Springfield, Mass., assignor to The Osmo Garden Company, Philadelphia, Pa., a corporation of Delaware Application February 27, 1936, Serial No. 65,948

7 Claims. (Cl. 92—3)

The subject of this invention is a pot or container for growing plants and more especially seedlings such as are transferred after preliminary development or growth under controlled conditions, as in a nursery or hot house, to the ground. A principal object of this invention is to provide a pot or container which, besides being a desirable holder for the soil and plant roots during the initial development or nursing of the plant, may advantageously serve as the container in which the plant is shipped and be finally embedded in the ground or soil in which full growth or maturation of the plant is to be effected.

In accordance with the present invention, the plant pot or container has a fibrous wall structure containing as its main or preponderant ingredient leather fiber such as is available at low cost from waste or scrap leather, for instance, the tanned scrap produced in large quantities as trimmings, skivings, etc. in the shoemaking industry. While not limited thereto, scrap chrome-tanned sole leather or scrap sole leather of other tannages is illustrative of the sort of raw material that may enter into the fabrication of the pots or containers hereof. In fabricating the pots or containers hereof, it is necessary first to defiberize or comminute the scrap leather into a mass of fibrous material that lends itself to molding from aqueous suspension directly into pots or to sheeting from aqueous suspension on a papermaking machine into a felted web or board capable of being formed up into pots.

The scrap leather may be defiberized or comminuted preparatory to the molding or sheeting operation either in dry or wet condition. Thus, the dry scrap may be introduced into an impact machine, such as a hammermill, designed to pound the leather pieces into fibrous fragments or shreds capable of being suspended in water as a pulp and then molded in foraminous or wire cloth molds into the desired pot shape; or the dry-shredded mass may be mixed with water to form a pulp suspension which, preferably with some preliminary beating, is run off on a papermaking machine into a sheet, which is cut into blanks of a shape appropriate for development or assembly into the ultimate pot. Again, the leather scrap may be disintegrated only by beating in water until a fibrous suspension or half-stuff such as is satisfactory for sheeting on a papermaking machine is realized. In other words, the reduction of the leather scrap may be accomplished in much the same way as is usual in making so-called leather board. As in the case of the dry-shredded leather scrap, the beaten or wet-ground scrap may at suitable consistency or water content be molded directly into pot form or first transformed into sheets designed to be cut into the pot blanks.

Because of the acid nature of the usual tanned leather scrap and the tendency of the acid associated with the scrap to be leached out of the pot wall into the soil in which the plant is initially cultivated and also into the soil to which the plant is subsequently transferred and thus to create in the soil a condition or environment inimical to plant growth, it is desirable in accordance with the present invention to neutralize or destroy the acid content of the reduced scrap from which the pot is fabricated, irrespective of whether reduction of the scrap is performed in a dry or wet way. In the case of dry-shredded leather scrap, dry shredding may be carried to a point where the dry-shredded stock requires little wet manipulation, as in a beater engine, to be conditioned for the molding or sheeting operation. In such case, the dry-shredded stock may be neutralized with suitable alkali as it is undergoing the wet-manipulative treatment, as in a beater engine, such treatment exposing for neutralization the acid or tanning agent content of the stock. When the scrap is disintegrated in the presence of water in a beater engine, the beating action liberates in considerable degree the acid or tanning agent in the beater waters; and so, too, the pulped leather or leather fibers are in a condition to be substantially completely neutralized by the addition of suitable alkali. While various alkalies might be used as neutralizing agent, it is preferable to employ lime for this purpose, as lime is inexpensive and does not tend to dissolve or otherwise injure sensibly the leather fibers but yet contributes to the wet strength and toughness of the pot wall. In this connection, it might be noted that the wall structure of the pots hereof are preferably made with a degree of porosity such as permits water to be absorbed quickly thereby and their ultimate disintegration in the soil by weathering and/or by the penetration of the plant roots therethrough. The use of mild alkali for neutralizing the acid or tanning agent content of the reduced leather stock ensures the appropriate porosity in pots fabricated from such stock as well as the strength, both dry and wet, in the pot wall necessary during the initial cultivation of the plant and subsequent transportation of the plant in the pot. As regards the factor of wet strength, which is especially important in the walls of the pots hereof, it might be observed that leather fiber, as distinguished from cellulose fiber, yields a pot wall of extraordinarily high wet strength, namely, a wet strength consonant with the maintenance of the integrity of the pot until such time as the pot has been embedded in the ground and the plant roots have grown to a stage where they penetrate the pot wall and disintegration of the pot wall is desired. In other words, the pots hereof stand up well during that period, say, four to eight weeks, when, as is customary hot house practice, seedlings placed therein are cultivated by standing the pots on moist porous beds, sometimes termed cinder beds.

Despite the fact that cellulose fiber might offhand be considered as a desirable addition to the reduced leather stock hereof for the purpose of promoting interfelting into uniform texture especially on a papermaking machine or lowering the cost of manufacture of the finished articles hereof, I have concluded that it is distinctly preferable to avoid the inclusion of any significant amount of cellulose fiber with the leather stock. This conclusion is attributable to the fact, now recognized by agricultural authorities, that cellulose fiber as it undergoes decomposition induces the growth of certain moulds or bacteria which flourish on soil nutriment, especially the nitrogenous nutriment necessary for plant growth. The cellulose fiber thus furnishes an environment favorable to bacteria that deplete the soil of plant nutriment; and it is principally for this reason that I abstain from the inclusion of chemical wood pulps, waste papers, or similar cellulosic fibrous material commonly used in papermaking or boardmaking furnishes. However, non-cellulosic fibers may be added in subordinate proportion to the reduced leather stock hereof. Thus, inert or mineral fibers of the character of mineral wool or asbestos may be added in the amount of about 10 to 20%, based on the dry weight of the leather scrap; and nitrogenous fibers, such as wool and hair, may be used in similar amount particularly when it is desired to increase the porosity of the pot wall so as to permit easier penetration of the wall by the plant roots when the pot is transferred to the ground. As is well known, leather fiber eventually decomposes in the soil into forms of nitrogen constituting plant nutriment; and this is also true to some extent of other nitrogenous fibers, like wool or hair, admixed with the leather fiber. It is thus seen that the pots hereof ultimately yield valuable soil constituent and are in any event made up of materials innocuous to plants.

While the reduced leather scrap is preferably treated in most cases with lime or equivalent mild alkali in amount to acquire a substantially neutral condition, yet for those plants that flourish best in an acid soil the treatment may be terminated on the acid side. Typical of those plants that flourish best in acid soil are laurel, rhododendron, various evergreens, some varieties of lilies, and others; and for such plants, the pot wall may be left acid, for instance, at a pH value of 3.5 to 5.5. On the other hand, in the case of such plants as Alpine plants, which flourish best in limed or alkaline soil, the pot wall as fabricated may be on the alkaline side, for instance, be at a pH value of about 7.2 to 8. Of course, the pot wall may be impregnated with various fertilizing ingredients, such as ammonium sulphate, sodium nitrate, etc., which ingredients may be incorporated either into the reduced leather stock preparatory to its molding or sheeting or into the wall structure of the finished pot, as by impregnating the structure with an aqueous solution thereof. Water-insoluble fertilizers may advantageously be added to the stock preparatory to forming pots therefrom, whereas it is usually preferable to impregnate the finished pot wall with water-soluble fertilizers in the form of aqueous solutions, unless molding or sheeting of the stock is done on machines equipped with a closed or largely closed white-water system.

An example of procedure accordant with the present invention may be carried out generally as follows. A beater engine is charged with 100 parts of scrap leather, for instance, chrome-tanned scrap sole leather, together with sufficient water to ensure circulation, say, sufficient water to yield a beaten stock of about 3 to 5% consistency or fiber content. After the scrap has been beaten to a stage where it is smooth and can give a uniformly textured sheet on a papermaking machine, it may be treated with lime in amount calculated to neutralize substantially completely its acid content. Such leather scrap as I have mentioned may require the addition of about 10 parts by weight of lime, which is preferably added in finely pulverulent and hydrated condition and is admixed with the stock while the beater roll is raised from the bed-plate of the engine and is operating essentially as a mixer. The time of beating of such leather scrap as may be used as raw material may be about two to four hours; and an additional period of about one-half hour may be allowed for the neutralization of the stock by the lime which, in the particular condition and amount added, tends to dissolve rapidly and substantially completely in the large excess of beater or slushing water and thus to neutralize the acid components of the stock particularly when circulation of the stock is being accomplished with some brushing or smoothing action thereon by the beater roll. Once neutralization of the stock is completed, it may be further diluted with water to the usual feltmaking or boardmaking consistency, say, a consistency of about ½%, and delivered to any suitable type of papermaking machine, for instance, a wet or cylinder machine, a multi-cylinder machine or a Fourdrinier machine operated to deliver a dried sheet of the desired caliper or thickness. It is, of course, possible to form sheets of various thicknesses, but sheets of a thickness of about 0.015 to 0.035 inch are best adapted to flower pots, since they are of the desired rigidity, strength, and other qualities and yet ultimately go to pieces in the ground as the plant roots require room for further growth.

Rather than forming sheets from the lime-treated reduced leather stock, it is possible to mold the stock directly into flower pots, as by delivering the stock at suitable dilution or consistency to suitable foraminous or wire cloth molds in accordance with the usual practices of molding pulp articles. Inasmuch as molded pulp articles are generally more fragile than articles formed up from fibrous sheet material produced on a papermaking machine, it is preferable that the walls of the molded pots hereof be of a thickness considerably greater than that of pots formed up from pre-felted sheet material, for instance, be of a thickness of about 0.30" or even greater.

In the accompanying drawing, wherein I have shown various forms or shapes which the pots hereof may assume, Figure 1 is a perspective, partly in section, of a molded pot such as may be fabricated hereby;

Figure 2 is a similar view of a two-piece pot;

Figure 3 illustrates similarly a pot that lacks a bottom;

Figure 4 shows a blank designed to be formed up or developed into a pot;

Figure 5 depicts the blank of Figure 4 formed up into the pot;

Figure 6 shows still another form of blank designed to be developed into a pot.

The pot 10 appearing in Figure 1, which is similar in its shape to the usual clay pot, may be molded from the bulk leather stock. Its walls 11 may be of substantial thickness and thus have adequate rigidity and strength. The pot bottom is shown with the usual drain-opening 12.

The two-piece pot shown in Figure 2 consists of a frusto-conically shaped member 13 affording the pot walls and a disc 14 affording the pot bottom and frictionally engaging the internal pot walls. Both the members 13 and 14 may consist of leather stock that has been sheeted on a papermaking machine. Thus, the disc 14 may be cut from a sheet or board fabricated on a papermaking machine and the frusto-conical member 13 may be formed up from a suitable blank cut from such a sheet, the side edges of the blank being cemented together or otherwise united, as by staples, in overlapping relationship into a seam (not shown). In some instances, however, the member 13 may be molded from the bulk leather stock, whereas the disc 14 may be cut from sheet material into which the stock is formed on a papermaking machine.

As is well known, loam that is best adapted for the growth of most plants, tends to pack firmly, particularly when moist; and such firm or tight packing is accentuated as the plant roots spread throughout the soil mass and grip the soil. In such instance, it is unnecessary to provide a pot bottom; and, as shown in Figure 3, a pot 15 without a bottom may be fabricated from the lime-treated leather stock hereof. In other words, the pot 15 may simply be the frusto-conical member 13 of the pot illustrated in Figure 2 and may be formed up in the very same way as that member. It should, however, be understood that the pot 15 might be of tubular configuration. While such a bottomless pot might tend to lose soil, if the soil were permitted to dry out practically completely, there is very little such tendency when the soil is initially packed properly and is kept sufficiently moist to promote plant growth. Moreover, as the plant grows, the soil tends to cling so tenaciously to its roots that there is little likelihood of soil loss through the open bottom so long as a small amount of moisture remains in the soil.

The pot blank of Figure 4 which is designed to be cut more particularly from the sheeted leather stock, can be rapidly developed or formed up into the pot depicted in Figure 5. The blank may include an upper band section 16 to constitute the pot side walls and a round lower section 17 to constitute the pot bottom. The upper section may contain a pair of spaced slits 18, 18a adjacent to one side edge 19 and a pair of tabs 20, 20a, the tab 20a projecting beyond the other side edge 21 and being adapted for insertion through the slit 18a and the tab 20 being located inwardly of the side edge 21 and being adapted for insertion through the slit 18, as depicted in the assembled or formed up pot of Figure 5. The lower section 17 may have a T-shaped tab portion 17a adapted to be inserted through spaced slits 22 in the upper section and thus to retain the pot bottom in place.

The pot blank of Figure 6 is adapted to be formed up or developed into a rectangular or box-like pot; and, to this end, the blank may, as shown, consist of an upper section 23 having four vertical lines of fold 24, side edge portions 25 and 26 capable of being interlocked, and a rectangular bottom piece or section 27 foldably or hingedly secured along the horizontal line 28 to the upper section 23. The interlocking means shown is a T-shaped tab 29 projecting from the edge portion 25 and insertable through a pair of spaced slits 30 in the edge portion 26. The bottom piece or section 27 may include a T-shaped tab 31 projecting from the edge 32 opposite to the folding edge 28 and insertable through a pair of slits 33 in the upper section so as to retain such bottom piece in place.

As already indicated, the pots or containers hereof are destined for ultimate disintegration in the soil. In order to hasten such disintegration, the pot side walls are preferably provided with slits or apertures therethrough which, as the plant roots develop, induce rupture of the side walls and thus avoid stifling of root growth. Such slits 34 may, as shown in Figure 2, be distributed in staggered relationship throughout the pot side walls so that, as the plant roots need expansion beyond the confines of the pot side walls, the pot side walls give or stretch and, as expansion continues, ultimately burst. It is thus possible to avoid what is sometimes known as a "pot-bound" condition in the plant when the plant is transferred or permanently rooted in the ground. I have determined that these slits may advantageously be of about ½" length and be spaced apart about the same distance without detracting unduly from the strength of the pot side walls. Such size and spacing of slits comport with the desired expansion and ultimate bursting of the pot side walls without, however, resulting in premature opening of the slits such as might result in exposure and damage of the plant roots, which, in the case of seedlings, are hair-like and especially susceptible to injury.

An important advantage of the pots hereof, particularly during the transportation period, is their absorbency or capacity for holding water and thus maintaining the plants in proper condition during shipment. Before shipping plants in the containers hereof, they may be well wetted down with water, insomuch that the water will percolate from the soil into the pot walls where it will remain until the soil requires water and the water diffuses thereinto. It is thus seen that the walls of the pots hereof may serve as water reservoirs to prevent deterioration of the plant even though the soil contained therein would otherwise have dried out to a degree affording insufficient water-nutrition to the plant roots. Again, by reason of the absorbency of the pot walls, they prevent an accumulation of free or excess water in the soil such as injures or rots the roots, since such free or excess water as may be supplied to the soil immediately seeps into the pot side walls and is absorbed and retained thereby until needed by the soil for supporting plant life. Of course, the pots hereof might be placed in the usual ceramic or clay pots during that period when the plants are being carefully cultivated in a hot house, as on a cinder bed. Once the preliminary cultivation or growth of the plants is completed and the plants are ready for shipment, the pots hereof holding the cultivated plants may be removed from the clay pots, shipped, and finally embedded permanently in the ground, thus saving the cost of the far more expensive clay pots or the temporary paper or paperboard shipping pots sometimes used, which paper or paperboard, being made principally of cellulose fiber, depletes the supply of nitrogenous plant nutriment in the soil, whereas the leather or leather-wool pots hereof do not absorb such nutriment but, on the contrary, serve in due time to enhance the supply of such nutriment in the soil by reason of the nitrogenous character of leather and wool fibers.

I claim:—

1. A plant pot having an interfelted fibrous structure and composed of at least about 80% by weight of leather fiber and a remaining percentage of non-cellulosic fibrous material and fertilizer material.

2. A plant pot having an interfelted fibrous structure and composed of at least about 80% by weight of leather fiber and a remaining percentage of non-cellulosic fibrous material.

3. A plant pot having an interfelted fibrous structure and composed of at least about 80% by weight of leather fiber and a remaining percentage of mineral wool.

4. A plant pot having an interfelted fibrous structure and composed of at least about 80% by weight of leather fiber and a remaining percentage of asbestos.

5. A plant pot having an interfelted fibrous structure and composed of at least about 80% by weight of leather fiber and a remaining percentage of nitrogenous fiber other than leather.

6. A plant pot having an interfelted fibrous structure and composed of at least about 80% by weight of leather fiber and a remaining percentage of fertilizer material.

7. A plant pot having an interfelted fibrous structure and composed of at least about 80% by weight of leather fiber and a remaining percentage of water-insoluble fertilizer material.

HENRY C. AVERY.